US009160882B2

(12) United States Patent  
Hara (10) Patent No.: US 9,160,882 B2  
(45) Date of Patent: Oct. 13, 2015

(54) IMAGE FORMING APPARATUS (71) Applicant: KYOCERA DOCUMENT SOLUTIONS INC., Osaka (JP)

(72) Inventor: Nobuhiro Hara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/091,015

(22) Filed: Nov. 26, 2013

(65) Prior Publication Data  
US 2014/0146365 A1 May 29, 2014

(30) Foreign Application Priority Data

Nov. 28, 2012 (JP) ................................. 2012-259671

(51) Int. Cl.  
*G06F 3/12* (2006.01)  
*H04N 1/32* (2006.01)

(52) U.S. Cl.  
CPC .... *H04N 1/32432* (2013.01); *H04N 2201/3295* (2013.01)

(58) Field of Classification Search  
CPC ......... G06F 12/00; G06F 15/00; G06F 15/16; G06F 17/00; G06F 17/30; G06Q 10/00; G06Q 40/00; H04N 1/00; H04N 1/32; H04N 1/32432; H04N 2201/3295  
USPC ......... 358/1.15, 1.16; 705/342; 707/722, 737, 707/741, 813, 829; 709/217, 228; 712/1; 715/200, 201, 760; 717/136  
See application file for complete search history.

(56) References Cited

U.S. PATENT DOCUMENTS

| 8,345,294 | B2 | 1/2013 | Tomita et al. |
| 2003/0115218 | A1* | 6/2003 | Bobbitt et al. ............... 707/200 |
| 2003/0163462 | A1* | 8/2003 | Kawamura ....................... 707/3 |
| 2005/0067491 | A1* | 3/2005 | Ishikawa et al. .............. 235/383 |
| 2005/0273772 | A1* | 12/2005 | Matsakis et al. .............. 717/136 |
| 2006/0031196 | A1* | 2/2006 | Oral et al. ......................... 707/3 |
| 2008/0055661 | A1* | 3/2008 | Yoshida ........................ 358/403 |
| 2008/0281873 | A1* | 11/2008 | Muroi ........................... 707/200 |
| 2008/0320377 | A1* | 12/2008 | Seetharamakrishnan et al. .............................. 715/200 |
| 2009/0265385 | A1* | 10/2009 | Beland et al. .............. 707/104.1 |
| 2010/0138426 | A1* | 6/2010 | Nakayama et al. ........... 707/741 |
| 2011/0016164 | A1* | 1/2011 | Maeshima et al. ........... 707/813 |
| 2013/0013729 | A1* | 1/2013 | Bennett ........................ 709/217 |

FOREIGN PATENT DOCUMENTS

JP 2006-287806 A 10/2006

* cited by examiner

*Primary Examiner* — David S Cammack  
(74) *Attorney, Agent, or Firm* — Studebaker & Brackett PC (57) ABSTRACT

An image forming apparatus includes a document box, a communication unit, a console unit, a referencing entity management table, and a control unit. The console unit accepts a delete operation of inputting a delete instruction to delete document data stored in the document box. The referencing entity management table allows information about another image forming apparatus referencing document data stored in the document box to be registered therein as referencing entity information. The control unit determines whether or not the document data to be deleted designated by the delete instruction input by the delete operation is referenced by another image forming apparatus, based on the referencing entity management table. The control unit, if the document data to be deleted is referenced by another image forming apparatus, causes the communication unit to transmit the document data to be deleted to the another image forming apparatus based on the referencing entity information.

1 Claim, 5 Drawing Sheets

FIG. 1

Image forming apparatus 10a

| Box number | Document name | Reference flag | Reference information |
|---|---|---|---|
| 0 0 1 | Document A | 0 | — |
| 0 0 1 | Document B | 1 | 1 0 b : 0 0 2 |
| 0 0 1 | Document C | 1 | 1 0 c : 0 0 1 |
| 0 0 2 | Document D | 0 | — |
| 0 0 2 | Document E | 0 | — |

FIG. 2A

Image forming apparatus 10b

| Box number | Document name | Reference flag | Reference information |
|---|---|---|---|
| 0 0 1 | Document A | 1 | 1 0 a : 0 0 1 |
| 0 0 1 | Document F | 0 | — |
| 0 0 2 | Document B | 0 | — |
| 0 0 2 | Document G | 0 | — |

FIG. 2B

Image forming apparatus 10c

| Box number | Document name | Reference flag | Reference information |
|---|---|---|---|
| 0 0 1 | Document C | 0 | — |
| 0 0 1 | Document H | 0 | — |
| 0 0 2 | Document D | 1 | 1 0 a : 0 0 2 |
| 0 0 2 | Document I | 0 | — |

FIG. 2C

Image forming apparatus 10a

| Box number | Document name | Referencing entity information | Number of times of reference printing | Date and time of last referencing |
|---|---|---|---|---|
| 001 | Document A | 10b:001 | 23 | 2012.09.30 |
| 002 | Document D | 10c:002 | 2 | 2012.04.06 |

FIG. 3A

Image forming apparatus 10b

| Box number | Document name | Referencing entity information | Number of times of reference printing | Date and time of last referencing |
|---|---|---|---|---|
| 002 | Document B | 10a:001 | 56 | 2012.10.26 |

FIG. 3B

Image forming apparatus 10c

| Box number | Document name | Referencing entity information | Number of times of reference printing | Date and time of last referencing |
|---|---|---|---|---|
| 001 | Document C | 10a:001 | 32 | 2012.10.05 |

IMAGE FORMING APPARATUS

INCORPORATION BY REFERENCE

The present application claims priority under 35 U.S.C. §119 to Japanese Patent Application No. 2012-259671, filed Nov. 28, 2012. The contents of this application are incorporated herein by reference in their entirety.

BACKGROUND

The present disclosure relates to image forming apparatuses, such as a copy machine, a multifunction peripheral (MFP), etc., which have the document box function of storing document data, and document management methods which are performed using a plurality of such image forming apparatuses.

Image forming apparatuses with the document box function of storing document data have in recent years been developed. In this type of image forming apparatuses, document data stored in a document box can be printed on demand. Also, the following technique has been proposed. Specifically, in this technique, a plurality of image forming apparatuses having a document box are connected together via a network. Document data stored in the document box of each image forming apparatus can be referenced by the other image forming apparatuses. When document data stored in one image forming apparatus (a referenced image forming apparatus or a referenced entity) is referenced by another one (a referencing image forming apparatus or a referencing entity), the referenced document data is registered as a reference document in a document box of the referencing image forming apparatus. In this technique, the document data registered as a reference document is not stored in the referencing image forming apparatus. When the referencing image forming apparatus is instructed to print the reference document, the document data of the reference document is transmitted from the referenced image forming apparatus storing the document data of the reference document via the network to the referencing image forming apparatus. After receiving the transmitted document data, the referencing image forming apparatus prints the document data.

SUMMARY

An image forming apparatus according to the present disclosure includes a document box, a communication unit, a console unit, a referencing entity management table, and a control unit. The document box is configured to store document data. The communication unit is configured to transmit and receive data to and from another image forming apparatus connected thereto via a network. The console unit is configured to accept a delete operation of inputting a delete instruction to delete document data stored in the document box. The referencing entity management table is configured to allow information about another image forming apparatus referencing document data stored in the document box to be registered therein as referencing entity information. The control unit is configured to determine whether or not the document data to be deleted designated by the delete instruction input by the delete operation is referenced by another image forming apparatus, based on the referencing entity management table. The control unit is also configured to, if the document data to be deleted is referenced by another image forming apparatus, cause the communication unit to transmit the document data to be deleted to the another image forming apparatus based on the referencing entity information.

A method for managing documents according to the present disclosure includes accepting a delete instruction to delete document data stored in a document box, determining whether or not the document data to be deleted designated by the delete instruction is referenced by another image forming apparatus, and transmitting the document data to be deleted to the another image forming apparatus if the document data to be deleted is referenced by the another image forming apparatus.

DETAILED DESCRIPTION

An embodiment of the present disclosure will now be specifically described with reference to the accompanying drawings. Note that the same reference characters designate the same or corresponding parts throughout the several drawings, and will not be redundantly described.

Figure 1:
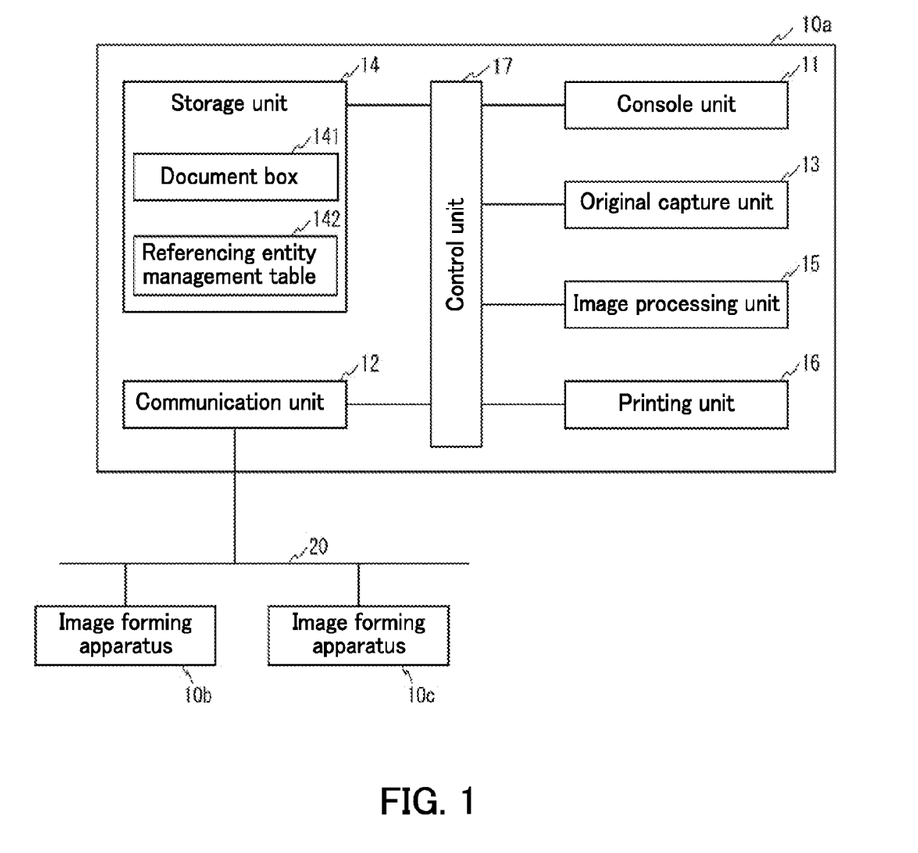
FIG. 1 is a block diagram schematically showing a configuration of an image forming apparatus according to an embodiment of the present disclosure.

FIG. 1 is a block diagram schematically showing a configuration of an image forming apparatus 10a according to this embodiment. The image forming apparatus 10a is a multifunction peripheral (MFP) which functions as a copy machine, a scanner, a network communication device, etc. As shown in FIG. 1, the image forming apparatus 10a includes a console unit 11, a communication unit 12, an original capture unit 13, a storage unit 14, an image processing unit 15, a printing unit 16, and a control unit 17.

The console unit 11 is the user interface. The console unit 11 includes a touch screen which functions as both a display unit and an input unit. The touch screen includes a liquid crystal display panel and a transparent pressure sensor provided on a surface of the liquid crystal display panel. The console unit 11 also includes various operation keys, such as a numeric keypad, a reset key, a stop key, an interrupt key, a start key, etc. The numeric keypad is used to input a numeric value, such as the number of copies, etc. The reset key is used to input an instruction to initialize setting information. The stop key is used to stop a copying process or delete an input numeric value. The interrupt key is used to input an instruction to perform interrupt copying. The start key is used to input an instruction to start a printing process.

The communication unit 12 has a function of transmitting and receiving various data to and from other image forming apparatuses 10b and 10c via a network 20, such as a LAN etc. Note that the image forming apparatuses 10a, 10b, and 10c have the same configurations. The image forming apparatuses 10a, 10b, and 10c can also perform the same process and the same operation.

The original capture unit 13 is a scanner. The original capture unit 13 illuminates an original fed by an original feeder (not shown) or an original placed on a platen glass by the user. The original capture unit 13 receives reflected light etc. from the original to capture an original image.

The storage unit 14 is a semiconductor memory, a hard disk drive (HDD), etc. The storage unit 14 stores document data produced by the original capture unit 13, document data received by the communication unit 12, etc. Note that, in this embodiment, document data collectively refers to document information including image data, text data, graphic data, a combination thereof, etc.

The storage unit 14 has a document box 141. A document which can be printed on demand is registered in the document box 141. The document box 141 has a plurality of divided storage areas which are referred to as "boxes." The plurality of boxes are managed using respective unique "box numbers." Different documents are registered in different boxes. Each of the boxes can store the document data of a document registered in that box. The boxes may be previously provided. Alternatively, the image forming apparatus 10*a* may be configured to allow the user to set a box as appropriate. For example, different sets of boxes may be provided for different users. For example, different sets of boxes may be provided for different fields or categories.

Figure 2A:
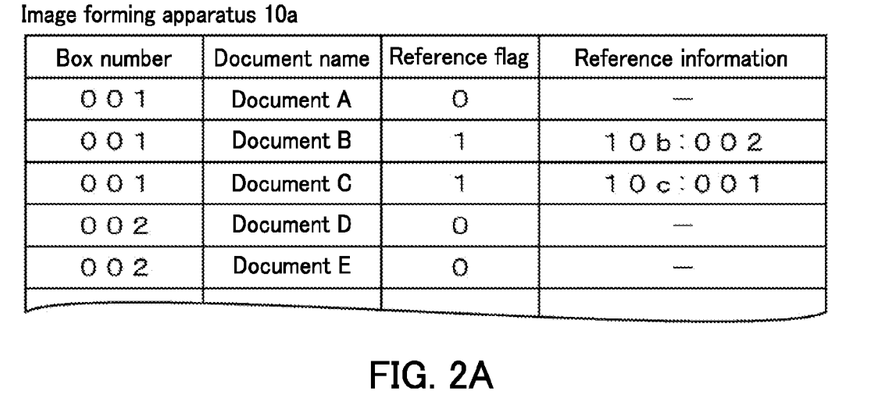
FIGS. 2A-2C are diagrams showing example registrations of document boxes according to the embodiment of the present disclosure.
Figure 2B:
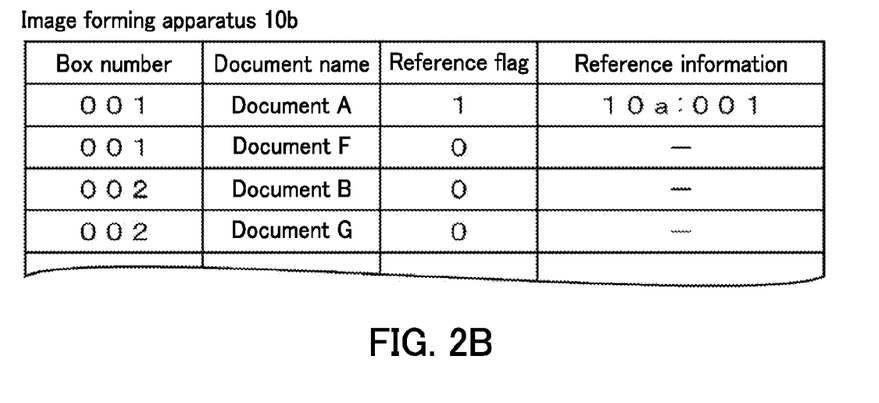
Figure 2C:
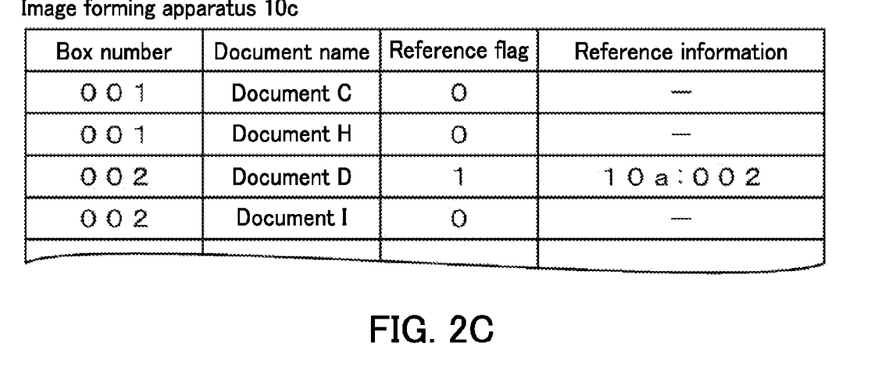

FIGS. 2A-2C show example registrations of the document boxes 141 of the image forming apparatuses 10*a*, 10*b*, and 10*c*, respectively. As shown in FIGS. 2A-2C, the document box 141 includes a plurality of boxes which are managed using "box numbers."

A "document name" of a document is registered in a corresponding box. A plurality of documents may be registered in a single box. For example, FIG. 2A shows an example in which three documents are registered in a box having a box number 001. In the description that follows, the box having the box number 001 etc. are designated by the box "001" etc.

A "reference flag" associated with a "document name" is registered in a corresponding box. The "reference flag" is information indicating whether or not the document data of a "document name" associated with the "reference flag" is stored in a box in which the "reference flag" is registered. If the "reference flag" is "0," the document data is stored. If the "reference flag" is "1," the document data is not stored. If the "reference flag" is "1," a reference document is registered. For example, when a reference document is registered in the document box 141 provided in the storage unit 14 of the image forming apparatus 10*a*, the document data of the reference document is stored in the document box 141 of another image forming apparatus 10*b* or 10*c*.

Moreover, if the "reference flag" is "1," "reference information" associated with the "reference flag" is registered. The "reference information" is used to identify a place where the document data of a reference document is stored. In this embodiment, a combination of information for identifying an image forming apparatus storing the document data of a reference document and the "box number" of a box storing the document data of the reference document is used as the "reference information."

FIGS. 2A-2C show an example in which the document data of a document name "document B" registered in the box "001" of the image forming apparatus 10*a* is stored in a box "002" of the image forming apparatus 10*b*, and the document data of a document name "document C" registered in the box "001" of the image forming apparatus 10*a* is stored in a box "001" of the image forming apparatus 10*c*. FIGS. 2A-2C also show an example in which the document data of a document name "document A" registered in a box "001" of the image forming apparatus 10*b* is stored in the box "001" of the image forming apparatus 10*a*. FIGS. 2A-2C also show an example in which the document data of a document name "document D" registered in a box "002" of the image forming apparatus 10*c* is stored in a box "002" of the image forming apparatus 10*a*.

Figure 3A:
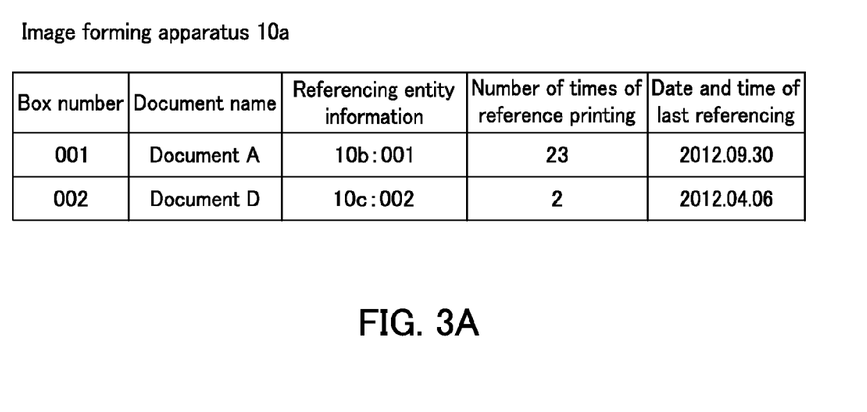
FIGS. 3A-3C are diagrams showing example registrations of a referencing entity management table according to the embodiment of the present disclosure.
Figure 3B:
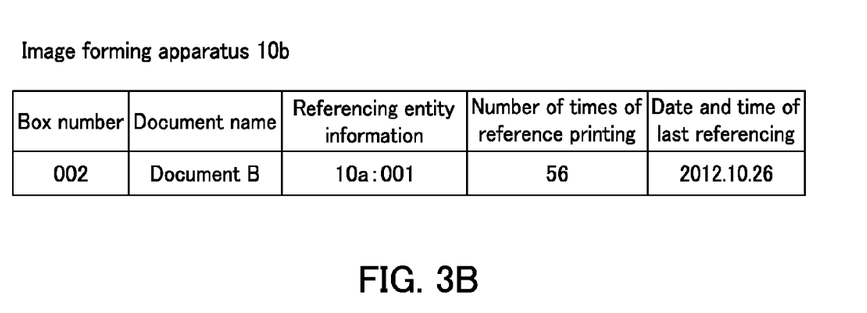
Figure 3C:
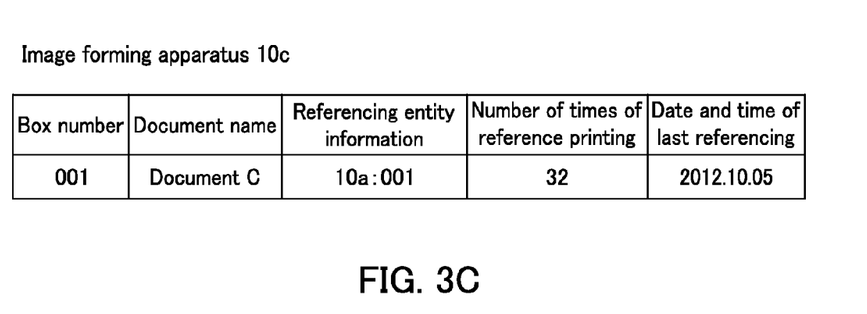

Referring back to FIG. 1, the image forming apparatus 10*a* will be further described. The storage unit 14 stores a referencing entity management table 142 in addition to the document box 141. In the referencing entity management table 142, information about document data which is referenced by another image forming apparatus 10*b* or 10*c* is registered. The referencing entity management table 142 contains information for identifying another image forming apparatus 10*b* or 10*c* which references document data stored in the document box 141. FIGS. 3A-3C show example registrations of the referencing entity management tables 142 of the image forming apparatuses 10*a*, 10*b*, and 10*c*, respectively. As shown in FIGS. 3A-3C, the referencing entity management table 142 contains a "box number," a "document name," "referencing entity information," the "number of times of reference printing," and the "date and time of last referencing." The "box number" and "document name" of the referencing entity management table 142 are information for identifying document data stored in the document box 141 provided in the storage unit 14 storing that referencing entity management table 142. The "referencing entity information" is information for identifying another image forming apparatus 10*a*, 10*b*, or 10*c* which references document data. The "number of times of reference printing" indicates the number of times which document data has been referenced. The "date and time of last referencing" indicates the date and time on which document data was last referenced.

FIG. 3A shows an example in which the document data of the document name "document A" stored in the box "001" of the image forming apparatus 10*a* is registered as a reference document in the box "001" of the document box 141 of the image forming apparatus 10*b*. FIG. 3A also shows an example in which the document data of the document name "document D" stored in the box "002" of the image forming apparatus 10*a* is registered as a reference document in the box "002" of the document box 141 of the image forming apparatus 10*c*. FIG. 3B shows an example in which the document data of the document name "document B" stored in the box "002" of the image forming apparatus 10*b* is registered as a reference document in the box "001" of the document box 141 of the image forming apparatus 10*a*. FIG. 3C shows an example in which the document data of the document name "document C" stored in the box "001" of the image forming apparatus 10*c* is registered as a reference document in the box "001" of the document box 141 of the image forming apparatus 10*a*.

Referring back to FIG. 1, the image forming apparatus 10*a* will be further described. The image processing unit 15 performs a predetermined image process on document data. For example, the image processing unit 15 performs an expansion/reduction process. Further, for example, the image processing unit 15 performs an image modification process, such as density adjustment, tone adjustment, etc.

The printing unit 16 prints document data stored in the storage unit 14 as a document image. For example, the printing unit 16 forms a latent image on a surface of a photoconductive drum based on document data read from the storage unit 14, develops the latent image using toner to form a toner image, transfers the toner image to recording paper, fixes the toner image to the recording paper, and discharges the recording paper.

The control unit 17 is connected to the console unit 11, the communication unit 12, the original capture unit 13, the storage unit 14, the image processing unit 15, and the printing unit 16. The control unit 17 controls an operation of the entire image forming apparatus 10a based on predetermined instruction information input from the console unit 11. The control unit 17 may be, for example, a microcomputer or the like including a read only memory (ROM), a random access memory (RAM), etc. In other words, the control unit 17 is an information processing unit. The ROM stores a control program for controlling an operation of the image forming apparatus 10a. The control unit 17 reads the control program stored in the ROM, and writes the read control program to the RAM. As a result, the control unit 17 controls the entire image forming apparatus 10a based on predetermined instruction information input from the console unit 11.

When a document in the document box 141 is selected and an instruction to print is input using the console unit 11, the control unit 17 initially references the "reference flag" of the document. If the "reference flag" is "0," i.e., the document data of the selected document is stored in the document box 141, the control unit 17 reads the document data from the document box 141, and performs a normal printing process based on the read document data. If the "reference flag" is "1," i.e., the selected document is a reference document, and the document data of the reference document is not stored in the document box 141, the control unit 17 transmits a document data transmission request for requesting transmission of the document data of the reference document based on the "reference information." The document data transmission request is transmitted to another image forming apparatus 10b or 10c which stores the document data of the reference document. The control unit 17, when receiving the document data requested by the document data transmission request from the image forming apparatus 10b or 10c, performs a reference printing process based on the received document data.

The control unit 17, when receiving a document data transmission request from another image forming apparatus 10b or 10c, reads from the document box 141 document data requested by the document data transmission request. Thereafter, the control unit 17 transmits the read document data to the requesting image forming apparatus 10b or 10c. The control unit 17 also increments the "number of times of reference printing" of the transmitted document data in the referencing entity management table 142, and updates the "date and time of last referencing." Note that, based on a notification from another image forming apparatus 10b or 10c, information about document data which is referenced by the image forming apparatus 10b or 10c is registered in the referencing entity management table 142. Specifically, when document data stored in the document box 141 is registered as a reference document in another image forming apparatus 10b or 10c, information indicating the registration of the document data as reference data is transmitted from the image forming apparatus 10b or 10c to the image forming apparatus 10a.

Figure 4:
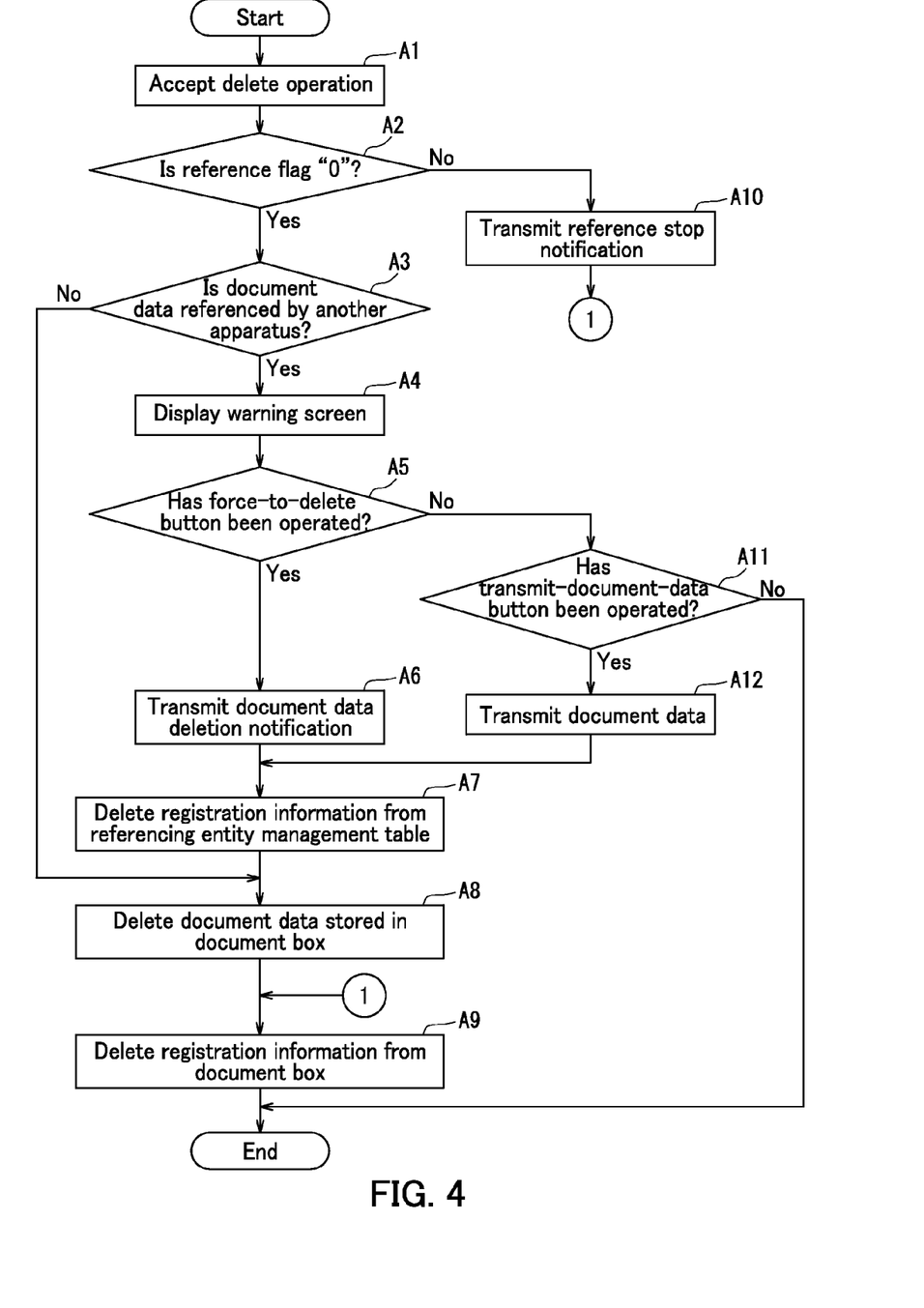
FIG. 4 is a flowchart for describing a document deletion process in the image forming apparatus according to the embodiment of the present disclosure.
Figure 5:
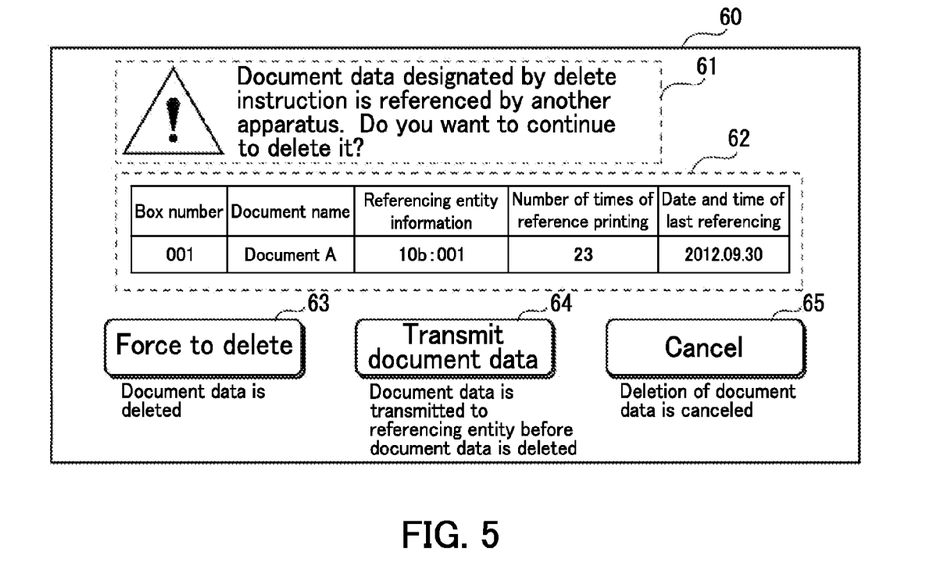
FIG. 5 is a diagram showing an example warning screen according to the embodiment of the present disclosure.

Next, a document deletion process of deleting a document registered in the document box 141 will be described in detail with reference to FIGS. 4 and 5. FIG. 4 is a flowchart for describing the document deletion process in the image forming apparatus 10a. FIG. 5 is a diagram showing an example warning screen.

As shown in FIG. 4, when the console unit 11 accepts an delete operation of inputting an instruction to delete a document registered in the document box 141 (step A1), the control unit 17 determines whether or not the "reference flag" of the document designated by the delete instruction is "0" (step A2). If the "reference flag" is "0" in step A2, i.e., the document data of the document designated by the delete instruction is stored in the document box 141, the control unit 17 determines whether or not information about the document data of the document designated by the delete instruction is registered in the referencing entity management table 142, i.e., whether or not the document data of the document designated by the delete instruction is referenced by another image forming apparatus 10b or 10c (step A3). The document data of the document designated by the delete instruction is also hereinafter referred to as "document data to be deleted."

If the determination result is positive (Yes) in step A3 (i.e., the document to be deleted is registered in the referencing entity management table 142), that is, the document data to be deleted is referenced by another image forming apparatus 10b or 10c, the control unit 17 causes the console unit 11 to display a warning screen 60 shown in FIG. 5 (step A4). The warning screen 60 has a message display area 61, a referencing entity information display area 62, a force-to-delete button 63, a transmit-document-data button 64, and a cancel button 65. The message display area 61 displays a warning message that the document data to be deleted is referenced by another apparatus. The referencing entity information display area 62 displays registration information of the referencing entity management table 142. The displaying of the registration information of the referencing entity management table 142 in the referencing entity information display area 62 allows the user to determine how often the document data to be deleted has been referenced by another image forming apparatus 10b or 10c.

Next, the control unit 17 monitors a button operation in the warning screen 60 to determine whether or not the operated button is the force-to-delete button 63 (step A5). If the determination result is positive (Yes) in step A5 (i.e., the operated button is the force-to-delete button 63), the control unit 17 transmits a notification (document data deletion notification) that the document data to be deleted has been deleted, to another image forming apparatus 10b or 10c which references the document data to be deleted, based on the "reference information" of the referencing entity management table 142 (step A6). As a result, the image forming apparatus 10b or 10c which has received the document data deletion notification can notify the user that document data which the image forming apparatus 10b or 10c references has been deleted.

Next, the control unit 17 deletes the registration information of the document data to be deleted from the referencing entity management table 142 (step A7). The control unit 17 also deletes the document data to be deleted stored in the document box 141 (step A8). The control unit 17 also deletes the registration information of the document data to be deleted from the document box 141 (step A9), and ends the document deletion process.

If the "reference flag" of the document designated by the delete instruction is not "0," i.e., is "1" in step A2, the control unit 17 transmits a notification (reference stop notification) that the referencing of the document has been stopped, to another image forming apparatus 10b or 10c storing the document data of the document (step A10). Next, control by the control unit 17 proceeds to step A9. As a result, the image forming apparatus 10b or 10c which has received the reference stop notification is allowed to delete the registration information of the document data to be deleted from the referencing entity management table 142.

If the determination result is negative (No) in step A5 (i.e., the operated button is not the force-to-delete button 63), the control unit 17 determines whether or not the operated button is the transmit-document-data button 64 (step A11). If the determination result is positive (Yes) in step A11 (i.e., the operated button is the transmit-document-data button 64), the control unit 17 transmits the document data to be deleted to another image forming apparatus 10b or 10c which references the document data to be deleted, based on the "referencing entity information" of the referencing entity management table 142 (step A12). Next, control by the control unit 17 proceeds to step A7. As a result, the image forming apparatus 10b or 10c is allowed to store the received document data to be deleted in the document box 141. In this case, the received document data to be deleted is stored in a box in which the document data to be deleted has been registered as a reference document. Also in this case, in the image forming apparatus 10b or 10c which has received the document data to be deleted, the "reference flag," which is a portion of registration information of the document data to be deleted, is rewritten from "1" to "0."

If the determination result is negative (No) in step A11 (i.e., the operated button is the cancel button 65 rather than the transmit-document-data button 64), the control unit 17 ends the document deletion process without deleting the document data to be deleted.

In this embodiment, the user is allowed to select one of the two deletion processes by operating the buttons. Specifically, one of the following deletion processes is selected: a deletion process ("forced deletion") in which the document data to be deleted is deleted without being transmitted to another image forming apparatus 10b or 10c; and a deletion process ("document data transmission") in which the document data to be deleted is deleted after being transmitted to another image forming apparatus 10b or 10c. Note that, alternatively, the document data to be deleted may be invariably transmitted to another image forming apparatus 10b or 10c which references the document data to be deleted. Alternatively, one of the two deletion processes may be automatically selected based on the registration information of the referencing entity management table 142. For example, the registration information of the referencing entity management table 142 contains the "number of times of reference printing" and the "date and time of last referencing," which indicate the frequency of referencing. Therefore, one of the deletion processes may be selected based on the frequency of referencing under conditions which are set based on the "number of times of reference printing" and the "date and time of last referencing."

As described above, in this embodiment, the image forming apparatus 10a includes the communication unit 12. The communication unit 12 transmits and receives data to and from another image forming apparatus 10b or 10c connected thereto via the network 20. The image forming apparatus 10a also includes the console unit 11. The console unit 11 accepts a delete operation of inputting an instruction to delete document data stored in the document box 141. The image forming apparatus 10a also includes the referencing entity management table 142. In the referencing entity management table 142, information about another image forming apparatus 10b or 10c which references document data stored in the document box 141 is registered as referencing entity information. The image forming apparatus 10a also includes the control unit 17. The control unit 17 determines whether or not document data to be deleted designated by the delete instruction input by the delete operation is referenced by another image forming apparatus 10b or 10c, based on the referencing entity management table 142. If the determination result is positive (i.e., document data to be deleted is referenced by another image forming apparatus 10b or 10c), the control unit 17 causes the communication unit 12 to transmit the document data to be deleted to another image forming apparatus 10b or 10c based on the referencing entity information. As a result, even when document data which is referenced by another image forming apparatus 10b or 10c is deleted from the image forming apparatus 10a, the document data of the reference document registered in the document box of the image forming apparatus 10b or 10c is not lost, and the image forming apparatus 10b or 10c continues to be able to print the reference document.

In this embodiment, the control unit 17, when determining that document data to be deleted is referenced by another image forming apparatus 10b or 10c, causes the console unit 11 to display the warning screen 60 indicating that the document data to be deleted is referenced by the image forming apparatus 10b or 10c. As a result, the user can be notified that the document data to be deleted is referenced by the image forming apparatus 10b or 10c, and therefore, is allowed to determine whether to delete the document data to be deleted.

In this embodiment, the control unit 17, when document data to be deleted is referenced, displays the warning screen 60 and then waits until the console unit 11 accepts an instruction to determine whether or not to transmit the document data to be deleted. When the console unit 11 accepts an instruction to transmit the document data to be deleted, the control unit 17 causes the communication unit 12 to transmit the document data to be deleted to another image forming apparatus 10b or 10c based on the referencing entity information. As a result, the user is allowed to determine whether or not to transmit the document data to be deleted to another image forming apparatus 10b or 10c.

In this embodiment, the referencing entity management table 142 stores, in addition to the referencing entity information, frequency information (the "number of times of reference printing" and the "date and time of last referencing") indicating the frequency of referencing of document data which is referenced. The warning screen 60 contains the referencing entity information display area 62 in which the referencing entity information and the frequency information are displayed. As a result, the user is allowed to determine whether to delete document data to be deleted without or after transmitting the document data to be deleted, based on the frequency information.

Note that it will be clearly understood that the present disclosure is not limited to the above embodiment, and various changes and modifications can be made to the above embodiment without departing the spirit and scope of the present disclosure.

What is claimed is:

1. An image forming apparatus comprising:
   a document box configured to store document data;
   a communication unit configured to transmit and receive data to and from another image forming apparatus connected thereto via a network;
   a console unit configured to accept a delete operation of inputting a delete instruction to delete document data stored in the document box;
   a referencing entity management table configured to allow information about another image forming apparatus referencing document data stored in the document box to be registered therein as referencing entity information,
      the referencing entity management table further containing frequency information indicating the frequency of referencing of document data referenced by another image forming apparatus,
      the frequency information including the number of times of reference printing and the date and time of last referencing,
      the number of times of reference printing indicating how many times printing based on the document data referenced by another image forming apparatus has been performed by the another image forming apparatus, and the date and time of last referencing indicating the date and time at which printing based on the document data referenced by another image forming apparatus was last performed by the another image forming apparatus; and a display unit; and a control unit configured to determine whether or not the document data to be deleted designated by the delete instruction input by the delete operation is referenced by another image forming apparatus, based on the referencing entity management table, wherein if determining that the document data to be deleted is referenced by another image forming apparatus, the control unit causes the display unit to display a warning screen indicating that the document data to be deleted is referenced by the another image forming apparatus, the warning screen having a frequency information display area in which the frequency information is displayed, causes, when the console unit accepts an instruction to transmit the document data to be deleted after the warning screen is displayed, the communication unit to transmit the document data to be deleted to the another image forming apparatus based on the referencing entity information and if determining that the document data to be deleted is not referenced by any other image forming apparatus, the control unit deletes from the document box the document data to be deleted.

* * * * *